Feb. 2, 1937.   B. ANDERSEN ET AL   2,069,202
PRODUCTION OF IMPROVED FILM
Filed June 9, 1934
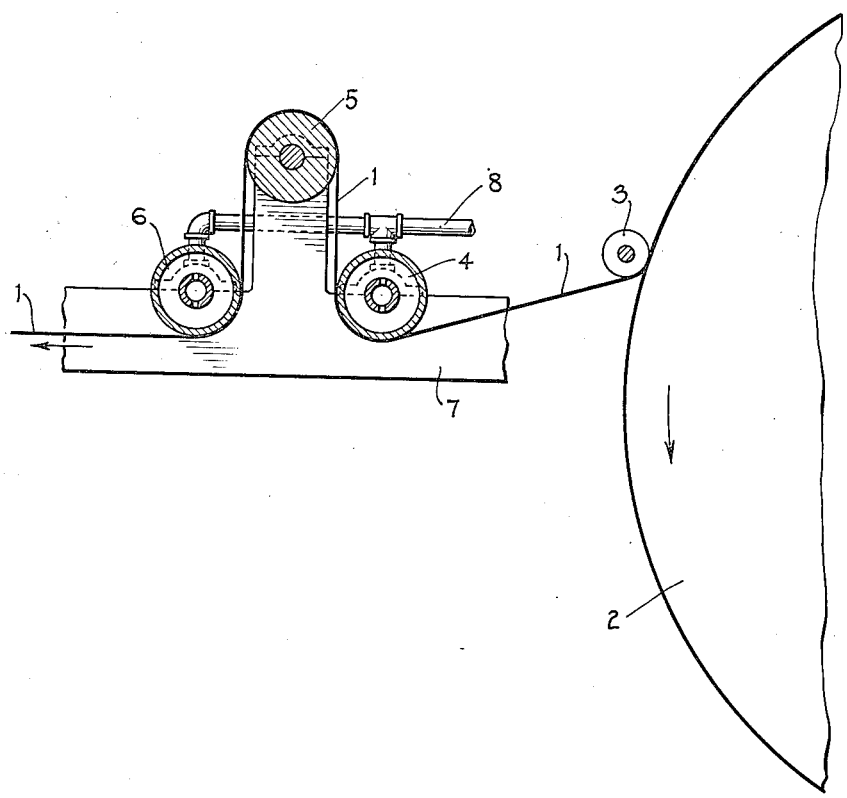
INVENTORS
BJORN ANDERSEN
RALPH H. BALL
BY
ATTORNEYS

UNITED STATES PATENT OFFICE 2,069,202

PRODUCTION OF IMPROVED FILM

Bjorn Andersen, Maplewood, and Ralph H. Ball, Elizabeth, N. J., assignors to Celluloid Corporation, a corporation of New Jersey Application June 9, 1934, Serial No. 729,872

12 Claims. (Cl. 18—57)

This invention relates to the manufacture of artificial film-like materials of cellulose derivatives that is to say, of cellulose derivative materials in the form of thin sheets, films, foils or the like and relates more particularly to the manufacture of film-like materials in which the tendency to curl is reduced or overcome. Among the materials which in the form of thin sheets, films, foils and the like have the disadvantage of curling may be mentioned cellulose acetate. Other cellulose derivative materials, such as cellulose nitrate; organic esters, e. g. cellulose formate, cellulose propionate and cellulose butyrate; and cellulose ethers, e. g. methyl cellulose, ethyl cellulose and benzyl cellulose; and materials of mixed cellulose derivatives, such as cellulose nitro acetate and mixtures of cellulose acetate and pyroxylin also have a tendency to curl.

Prior to the present invention thin sheets, films, foils and the like, all hereinafter termed "films", made by casting a solution of a cellulose derivative and a plasticizer in a volatile solvent on solid polished or smoothed surfaces and stripped after partial or complete drying, had a tendency to curl, that is, the films had a tendency to take on a transverse curvature, especially when exposed to elevated temperatures and high humidity. While the films heretofore made were flat immediately after being stripped, their tendency to curl manifested itself upon being exposed to the atmosphere. This curling of the films was accelerated if the exposure was effected in a heated and/or humidified atmosphere and the radius of curvature decreased upon continued exposure. In such industries as photography, card indexing and laminated glass where extreme flatness of film is desirable, the curling defects of film result in operating difficulties.

Many treatments, such as seasoning, steaming of the surface, back washing one or both sides of the film and coating with moisture-impermeable coatings, were tried for the purpose of preventing the curling of the films, without producing satisfactory results. It has been proposed to produce a substantially permanently flat film by giving it a continuous flat polishing treatment by passing the film between rolls under pressure at high temperatures. Such a treatment not only is very cumbersome and delicate since it involves heating the film to such high temperatures that the surface flows under pressure, but it is also apt to produce surface defects, such as heat and flow marks, in the films.

It is an object of the present invention to produce cellulose derivative films in which the tendency to curl is reduced or overcome, that is, films which will remain substantially permanently flat when exposed to elevated temperatures and/or high humidity.

A further object of the invention is the provision of a simple apparatus by means of which substantially permanently flat films are produced.

Other objects of this invention will appear from the following detailed description and will be pointed out in the appended claims.

We have found a simple and effective treatment for cellulose derivative films made by casting a solution of a cellulose derivative in a volatile solvent on solid polished or smoothed surfaces. Such films have what is termed in the art an air side and a wheel side, the wheel side being the side which was stripped from the solid underlayer, after partial or complete drying, and the air side being the side of the film facing the atmosphere. It will be found that the air side is always more tacky than the wheel side and will cause more friction than the wheel side when rubbed against another body. The reason for this difference in the characteristics between the two sides of the film is apparently caused by the solvent escaping through the air side before the film is stripped from the solid underlayer upon which it was cast. The air side of the stock will also have a chance to contract and find its own equilibrium more readily than the wheel side where the particles are held firmly by the underlayer and thus preventing a natural contraction and equalization of stresses. On stripping the film from the underlayer, some solvent will escape through the surface of the wheel side and, in addition, the wheel side will now have a chance to contract, resulting in the curling of the film towards the said wheel side, that is the film will assume a transverse curvature with the wheel side concave in form. When such a film is made of an organic derivative of cellulose, such as cellulose acetate, exposure of the same to high temperature and humidity causes it to curl rather badly.

In accordance with our invention, we produce cellulose derivative films which have little tendency to curl but remain substantially permanently flat by passing the two surfaces of the films successively over a series of two or more hot highly polished metal surfaces in such a manner that the air side of the film is subjected to a higher temperature than the wheel side. We have found this differential heat treatment of the film to be important in order that the natural tendency of the wheel side to shrink be counteracted. In other words, by this differential heat treatment, an artificial shrinkage is superimposed on the two surfaces in the opposite order of the natural shrinkage tendency which the two surfaces have after casting and normal seasoning of the film stock. During the treatment with hot surfaces, the shrinkage takes place on the side of the film which is in contact with the hot surface.

Our process of preventing the curling of the film obviates the necessity of flowing the surface thereof, that is to use such pressure on the film surfaces so that the material of the film flows at the temperature employed, such as in the case of the prior process above described. The process of the present invention eliminates the use of high temperatures, such as cause the surface of the film to become plastic, and high pressures which are injurious to the surfaces of the film.

As an example of performing the invention, the film made from a cellulose derivative, such as cellulose acetate, and plasticizers thereof is passed through an apparatus comprising in its simplest form three highly polished, independently heated, metal drums running at such a rate of speed that the film will have about a one minute contact time on the surface of each drum. The film is threaded through the apparatus and the drums are heated in such a manner that the air side of the film contacts with the first drum maintained at a temperature of between 215° and 250° F., the wheel side contacts with the second drum at between 60° and 185° F. and the air side again with the third drum at between 215° and 250° F.

The plasticizer may be any suitable one for the particular cellulose derivative or mixture of cellulose derivatives employed. The plasticizers may be high boiling solvents or softening agents such as, for example, the aryl sulphonamides, i. e. para ethyl toluol sulphomide; the alkyl phthalates, i. e. dimethyl phthalate and diethyl phthalate; the alkyl tartrates, i. e. dibutyl tartrate; the alkoxy esters of polybasic organic acids, i. e. diethoxy ethyl phthalate; the polybasic acid esters of the mono alkyl ethers of polyhydric alcohols, i. e. diethylene glycol ethyl ether ester of phthalic acid; the alkyl esters of phosphoric acid, i. e. triethyl glycol phosphate; the aryl esters of phosphoric acid, i. e. tricresyl phosphate and triphenyl phosphate; the mixed alkyl and aryl phosphates and camphor. The plasticizers may be used alone or in combination with others. The quantity of plasticizer employed may vary within great limits, say from 10 to 75 parts by weight per 100 parts of the cellulose derivative in the finished product.

The following formulae produce excellent film forming solutions. However, it is to be understood that these formulae are given merely by way of illustration and that they are in no sense limitative.

Example I

| | Parts by weight |
|---|---|
| Cellulose acetate | 100 |
| Triphenyl phosphate | 15 |
| Diethyl phthalate | 15 |
| Acetone | 300 |
| Methyl alcohol | 50 |

Example II

| | |
|---|---|
| Cellulose acetate | 90 |
| Cellulose nitrate | 10 |
| Dibutyl tartrate | 15 |
| Ethylene dichloride | 300 |
| Methyl alcohol | 50 |
| Ethylene glycol monomethyl ether | 15 |

Example III

| | |
|---|---|
| Cellulose nitrate | 100 |
| Diethyl phthalate | 15 |
| Butyl alcohol | 15 |
| Ethyl alcohol | 190 |
| Ether | 130 |

Example IV

| | |
|---|---|
| Cellulose nitrate | 100 |
| Camphor | 10 to 50 |
| Acetone | 190 |
| Alcohol | 130 |

According to another form of execution of the invention, we cause the film to pass over the three drums as above, but in this form of execution the first and last drums only are heated and the air side of the film contacts the heated drums. The intermediate, or second, drum with which the wheel side of the film contacts is kept at approximately room temperature.

The accompanying drawing serves to illustrate a convenient form of apparatus for producing substantially permanently flat films, the figure being a side elevational view, partly in section, of the apparatus.

Referring to the drawing, a film 1, which was formed by casting a solution of a cellulose derivative and plasticizer in a volatile solvent on the highly polished surface of the casting wheel 2, is stripped therefrom at the guide roller 3. The film is then led under a drum 4 of the apparatus of our invention so that the air side of the film contacts with the surface thereof, then over a second, or intermediate drum 5, so that the wheel side of the film contacts with the surface thereof and then under a third drum 6 whereby the air side of the film is again in contact with the surface of the drum. One or more additional drums similar to drums 4, 5 and 6 may be added, if found necessary for treating films of different thicknesses or of different material. Furthermore, the drums with which the air side of the film contacts may be made of larger diameter than the drums with which the wheel side contacts, so as to increase the time of contact of the air side of the film with the drum. In such an arrangement, all the drums may be heated to the same temperature. However, in any arrangement of drums employed, the air side of the film is subjected to more heat than the wheel side.

The drums 4, 5 and 6 are mounted for positive rotation by any suitable means (not shown) on the frame 7.

For the purpose of heating the drums 4 and 6, a pipe 8 is provided for leading a heating fluid such as steam, hot liquids and the like from the source thereof (not shown) to the said drums. While in the drawing, the drum 5 is shown as having no heat supplying means, it will be readily appreciated that if it is desired to heat the same, a heating fluid at the desired temperature may be supplied thereto. The drums 4, 5 and 6 may be heated by any other suitable means, such as electric resistances, etc. As will be understood, the treated film may be wound upon any suitable take-up device.

While in the drawing there is shown a simple arrangement in close proximity to a film casting wheel, it is to be understood that the differential heat treating device can be installed in the driers of the apparatus for making films. Our device can also be used for flattening fully seasoned, or cured films.

Cellulose derivative film treated as set out above, the treatment varying slightly with the casting conditions and the formulation of the film, will remain substantially permanently flat, as will be evident from the data set out below.

(a) A cellulose acetate film, 75 ten thousandths of an inch thick, after flattening treatment similar to that just outlined, was given an accelerated curling test by cutting strips 1″×10″ (parallel to the lengthwise axis of the film) and suspending them for 10 days at a temperature of 140° F., in an atmosphere of 80–100% humidity. It assumed curvatures as given below:

| Time | 1 day | 4 days | 6 days | 9 days | 10 days |
|---|---|---|---|---|---|
| Radius of curvature | Flat | 10″ | 7″ | 6″ | 5″ |

(b) In the same accelerated curvature test, similar cellulose acetate film which had not been given our flattening treatment assumed curvatures as follows:

| Time | 2 hours | 4 hours | 1 day | 2 days |
|---|---|---|---|---|
| Radius of curvature | 5″ | 3″ | 1″ | Less than 1″ |

Having thus described our invention, what we claim as new and desire to secure by Letters Patent of the United States is:

1. Method of reducing the tendency to curl of a film, foil, thin sheet or like product produced by depositing a film-forming solution containing a derivative of cellulose on a support, evaporating volatile solvent from the deposited solution, and stripping from the support the film or like product thus formed, which comprises subjecting said product to the action of heat applied by means of heated surfaces in greater quantity to the air side than to the wheel side thereof.

2. Method of reducing the tendency to curl of a film, foil, thin sheet or like product produced by depositing a solution of cellulose acetate in a volatile solvent therefor on a support, evaporating volatile solvent from the deposited solution, and stripping from the support the film or like product thus formed, which comprises subjecting said product to the action of heat applied by means of heated surfaces in greater quantity to the air side than to the wheel side thereof.

3. Method of reducing the tendency to curl of a film, foil, thin sheet or like product produced by depositing a film-forming solution containing a derivative of cellulose on a support, evaporating volatile solvent from the deposited solution, and stripping from the support the film or like product thus formed, which comprises subjecting said product to the action of heat applied by means of heated surfaces only to the air side thereof.

4. Method of reducing the tendency to curl of a film, foil, thin sheet or like product produced by depositing a film-forming solution containing a derivative of cellulose on a support, evaporating volatile solvent from the deposited solution, and stripping from the support the film or like product thus formed, which comprises passing said product in contact with heated surfaces in such a manner that the air side of said product is subjected to a higher temperature than the wheel side thereof.

5. Method of reducing the tendency to curl of a film, foil, thin sheet or like product produced by depositing a solution of cellulose acetate in a volatile solvent therefor on a support, evaporating volatile solvent from the deposited solution, and stripping from the support the film or like product thus formed, which comprises passing said product in contact with heated surfaces in such a manner that the air side of said product is subjected to a higher temperature than the wheel side thereof.

6. Method of reducing the tendency to curl of a film, foil, thin sheet or like product produced by depositing a film-forming solution containing a derivative of cellulose on a support, evaporating volatile solvent from the deposited solution, and stripping from the support the film or like product thus formed, which comprises passing said product in contact with heated surfaces in such a manner that the air side of said product is subjected to the action of heat for a longer period than the wheel side thereof.

7. Method of reducing the tendency to curl of a film, foil, thin sheet or like product produced by depositing a film-forming solution containing a derivative of cellulose on a support, evaporating volatile solvent from the deposited solution, and stripping from the support the film or like product thus formed, which comprises passing said product in contact with heated surfaces in such a manner that the air side of said product is subjected to the action of heat at a higher temperature and for a longer period than the wheel side thereof.

8. Method of reducing the tendency to curl of a film, foil, thin sheet or like product produced by depositing a film-forming solution containing a derivative of cellulose on a support, evaporating volatile solvent from the deposited solution, and stripping from the support the film or like product thus formed, which comprises passing said product in contact with surfaces heated to a uniform temperature in such a manner that the air side of said product is subjected to the action of heat for a longer period than the wheel side thereof.

9. Method of reducing the tendency to curl of a film, foil, thin sheet or like product produced by depositing a solution of cellulose acetate in a volatile solvent therefor on a support, evaporating volatile solvent from the deposited solution, and stripping from the support the film or like product thus formed, which comprises passing said product in contact with surfaces heated to a uniform temperature in such a manner that the air side of said product is subjected to the action of heat for a longer period than the wheel side thereof.

10. Method of reducing the tendency to curl of a film, foil, thin sheet or like product produced by depositing a film-forming solution containing a derivative of cellulose on a support, evaporating volatile solvent from the deposited solution, and stripping from the support the film or like product thus formed, which comprises causing the surfaces of said product to pass successively over differentially heated surfaces in such a manner that said product contacts with each surface for a period of about one minute a greater quantity of heat being applied to the air side than to the wheel side of said product.

11. Method of reducing the tendency to curl of a film, foil, thin sheet or like product produced by depositing a solution of cellulose acetate in a volatile solvent therefor on a support, evaporating volatile solvent from the deposited solution, and stripping from the support the film or like product thus formed, which comprises causing the surfaces of said product to pass successively over differentially heated surfaces in such a manner that said product contacts with each surface for a period of about one minute a greater quantity of heat being applied to the air side than to the wheel side of said product.

12. Method of reducing the tendency to curl of a film, foil, thin sheet or like product produced by depositing a solution of cellulose acetate in a volatile solvent therefor on a support, evaporating volatile solvent from the deposited solution, and stripping from the support the film or like product thus formed, which comprises subjecting the air side of said product to contact with a surface having a temperature of between 215° and 250° F. and the wheel side of said product to contact with a surface having a temperature of between 70° and 185° F.

BJORN ANDERSEN.
RALPH H. BALL.